(12) United States Patent
Haussmann

(10) Patent No.: US 8,726,687 B2
(45) Date of Patent: May 20, 2014

(54) METHOD FOR OPERATING AN AIR CONDITIONING UNIT FOR A CAR

(75) Inventor: Roland Haussmann, Wiesloch (DE)

(73) Assignee: Valeo Klimasysteme GmbH, Bad Rodach (DE)

( * ) Notice: Subject to any disclaimer, the term of this patent is extended or adjusted under 35 U.S.C. 154(b) by 907 days.

(21) Appl. No.: 12/426,452

(22) Filed: Apr. 20, 2009

(65) Prior Publication Data
US 2009/0266089 A1  Oct. 29, 2009

(30) Foreign Application Priority Data

Apr. 23, 2008 (DE) .......................... 10 2008 020 351

(51) Int. Cl.
*B60H 1/32* (2006.01)
(52) U.S. Cl.
USPC ................... 62/430; 62/199; 62/239; 62/244; 62/437
(58) Field of Classification Search
USPC .............. 62/56, 199, 239, 244, 335, 437, 513
See application file for complete search history.

(56) References Cited

U.S. PATENT DOCUMENTS 6,016,662 A * 1/2000 Tanaka et al. ................... 62/199
2004/0093889 A1* 5/2004 Bureau et al. ................... 62/434

OTHER PUBLICATIONS

Bartlett, Dean A. "Fundamentals of Heat Exchangers." AIP.org. American Institute of Physics, 1996. Web. Jun. 4, 2012. <http://www.aip.org/tip/INPHFA/vol-2/iss-4/p18.pdf>.*

* cited by examiner

*Primary Examiner* — Marc Norman
*Assistant Examiner* — Jonathan Bradford
(74) *Attorney, Agent, or Firm* — Howard & Howard Attorneys PLLC

(57) ABSTRACT

In an air conditioning unit for a car, which air conditioning unit has a refrigerant circuit with a primary consumer branch having a compressor, condenser, and an evaporator, which air conditioning unit also has at least one auxiliary consumer branch that is connected parallel to the primary consumer branch and has a cold accumulator and its own evaporator, a stop valve is arranged in front of each evaporator. After operational phases charging the cold accumulator, the stop valve of the primary consumer branch is regularly opened for only a predetermined opening time that depends on particular operating parameters. The substantial operating parameters are the air inlet temperature and the air mass flow at the evaporator of the primary consumer branch.

14 Claims, 2 Drawing Sheets

METHOD FOR OPERATING AN AIR CONDITIONING UNIT FOR A CAR

RELATED APPLICATIONS

Figure 1:
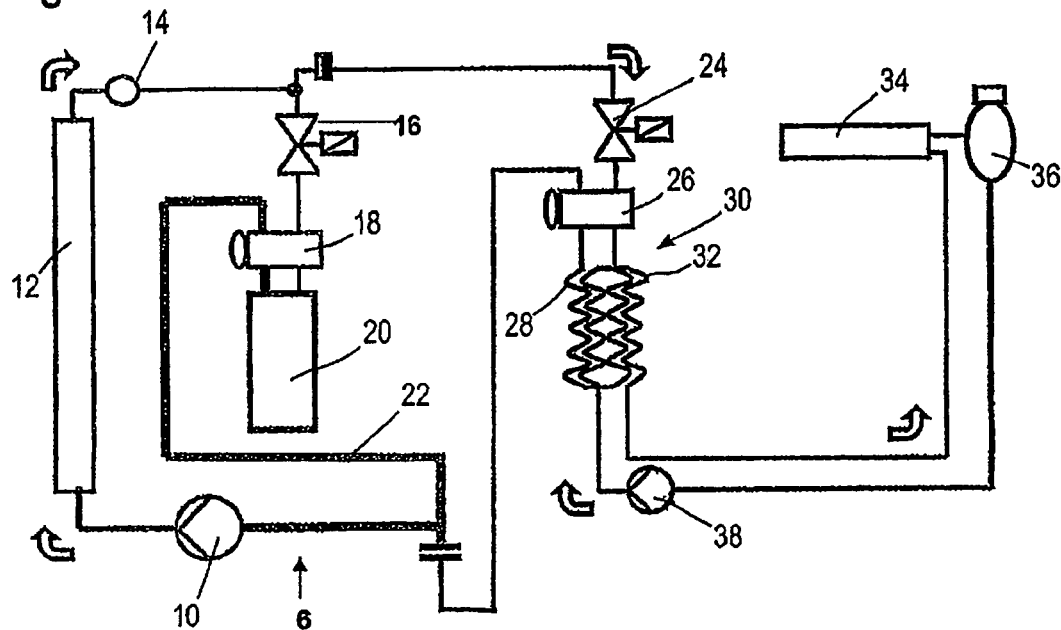

This application claims priority to and all the advantages of German Patent Application No. DE 10 2008 020 351.3, filed on Apr. 23, 2008.

The invention relates to a method for operating an air conditioning unit for a car, which air conditioning unit has a refrigerant circuit with a primary consumer branch having a compressor, condenser, and an evaporator, said air conditioning unit furthermore having at least one auxiliary consumer branch that is connected in parallel and has a cold accumulator and its own evaporator, a stop valve being arranged in front of each evaporator. Such an air conditioning unit is customarily a part of a heating, ventilating, and air conditioning unit that in technical literature is often characterized by the acronym HVAC (heating, ventilation and air conditioning).

Air conditioning systems having a cold accumulator make it possible to operate the air conditioning unit while the car is stationary. The need for air conditioning while stationary exists particularly in commercial vehicles such as trucks or buses and especially in recreational vehicles. Cold accumulators are, however, also useful as a complement to heating and air conditioning systems in conventional cars because such systems increase the available cooling capacity during times at which peak cooling performance is required. Such systems can also be equipped with smaller compressors.

During the operation of air conditioning units with cold accumulators, some problems do, however, arise. The cold accumulator requires its own consumer branch that is operated parallel to the primary consumer branch from the same refrigerant circuit. The known systems recognize only two switching statuses. In the first switching status, only the stop valve to the consumer branch of the cold accumulator is open and the stop valve to the primary consumer branch is closed. In this switching status, which can briefly be referred to as "charging", the cold accumulator is charged from the refrigerant circuit. The criterion for this first switching status is that the air temperature at the outlet of the evaporator in the primary consumer branch fall below a minimum limiting value that is in the range of 1° C. to 5° C. There is the risk of the evaporator frosting at lower temperatures. For this reason, the primary consumer branch is blocked and the available cooling capacity is used to charge the cold accumulator. In the second switching status, which can briefly be characterized as "cooling", the stop valve to the consumer branch of the cold accumulator is closed and the stop valve to the primary consumer branch is open. The criterion for this second switching status is that the air temperature at the outlet of the evaporator in the primary consumer branch surpass a maximal limiting value that is 4° C. to 10° C. The cooling capacity is reduced at higher temperatures and there is the possibility that a musty odor could arise.

Although the specified temperature values for the switching between the two "charging" and "cooling" switching statuses ensure a favorable cooling capacity and prevent musty odors from arising, when greater cooling performance is required in the primary consumer branch, it is, however, not possible to charge the cold accumulator to 100%. In order to achieve the cold accumulator charging to 100%, the temperature limit for the change from "cooling" to "charging" must be increased to 7 C to 10 C, for example. At the same time, the temperature limit for the change from "charging" to "cooling" must be increased to approximately 9° C. to 12 C. This, however, leads to high temperatures at the evaporator of the primary consumer branch and a correspondingly poor cooling capacity.

A further problem is the delayed ending of the evaporation process at the evaporator of the primary consumer branch during the change in the "charging" switching status. At this time, the evaporator is filled with liquid refrigerant. Since the suction effect from the refrigerant circuit lasts for some time, the liquid refrigerant is further evaporated. In the "charging" switching state, the evaporator temperature does indeed fall to −18° C. or even −20° C. The risk of frosting increases in the process. In order to avoid this situation, the change from "cooling" to "charging" cannot be effected at the truly advantageous low temperature of 1° C. to 5° C., but rather must be carried out at the substantially higher temperature of 8° C. to 12° C. This, however, leads not only to reduced cooling performance, but also to an uneven temperature distribution across the air flow at the evaporator, rendering it more difficult to detect reliably the temperature so as to avoid the formation of frost. These difficulties are particularly present in lower to mid-range cooling performance.

The method according to the invention obviates these problems and at the same time makes it possible to charge the cold accumulator to 100%. According to the invention, the method of the previously described type is characterized in that during operation phases during which the cold accumulator is being charged, the stop valve of the primary consumer branch is regularly opened for only a predetermined opening time that is dependent on the particular operating parameters. The most important operating parameters are the air inlet temperature and the air mass flow at the evaporator of the refrigerant circuit. In particular, in the preferred embodiment of the of the method, the stop valve of the primary consumer branch is controlled as follows: a) the stop valve of the auxiliary consumer branch is closed and the stop valve of the primary consumer branch is opened if the air outlet temperature at the evaporator of the primary consumer branch surpasses a maximal limit temperature in the range of approximately 3° C. to 10° C., preferably 5° C. Furthermore preferred is controlling the stop valve as follows: b) the stop valve of the auxiliary consumer branch is opened and the stop valve of the primary consumer branch is closed if either b1) the air outlet temperature at the evaporator of the primary consumer branch falls below a minimal limit temperature in the range of approximately 0° C. to 6° C., preferably 3° C.

or b2) the predetermined opening time for the stop valve of the primary consumer branch is surpassed.

The method according to the invention thus makes possible the alternating charging operation of the cold accumulator parallel to the cooling mode at lower air temperatures at the evaporator of the primary consumer branch. At the same time, differences in the air temperature and temporal temperature fluctuations are avoided. By limiting the opening time of the stop valve of the primary consumer branch, no more than a suitable amount of liquid refrigerant accumulates in the evaporator of said primary consumer branch. As a result, the air temperature at the evaporator does not decrease further after the stop valve in the primary consumer branch was closed. For this reason, it is possible to select the lower limit temperature of 3° C. as the criterion for closing this stop valve.

A further result of this lower temperature limit is that a lower mid-range outlet temperature of 5° C. to 7° C. is reached. This also leads to an improvement in the homogeneity at the outlet of the evaporator. Yet another substantial advantage is that a locationally determined coldest point for determining temperature in order to prevent the formation of frost is not necessary because the evaporator is also switched in a time-controlled manner. This time limitation also shortens the cycle times, thereby resulting in a reduction of the temporal fluctuations of the air temperature at the outlet.

According to a special embodiment, the stop valve to the auxiliary consumer branch of the cold accumulator remains permanently open as long as the cold accumulator is not completely charged and the condition remains met that the air outlet temperature at the evaporator of the primary consumer branch does not surpass the maximal limit value in the range of approximately 4° C. to 10° C. In a variant of this embodiment, the stop valve to the consumer branch with the cold accumulator is controlled independently from the open and closed state of the stop valve of the primary consumer branch, thus, for example, being alternatingly opened and closed. This type of operation can be advantageous, depending on the required cooling load and on the compressor speed, in charging the cold accumulator as fully as possible without diminishing cooling capacity.

After a longer, permanent charging, it could be necessary to shut off the compressor completely approximately 5 to 30 seconds prior to the opening of the stop valve to the primary consumer branch in order to prevent the frosting of the evaporator in this consumer branch. In this time period, the very low temperature required to charge the cold accumulator may rise to an uncritical value.

The limited opening time of the stop valve to the primary consumer branch can be estimated, calculated or determined from storage tables. The following amounts in particular are involved in the determination:

air mass flows at the evaporator of the cooling consumer branch air entry temperature.

Other values that should preferably be monitored are:

speed of the motor or compressor different pressure and temperature values at the cooling circuit and in the consumer circuits.

Advisable opening times range from several seconds to tens of seconds, tending toward longer times both with increasing air inlet temperature as well as increasing air mass flows.

Figure 2:
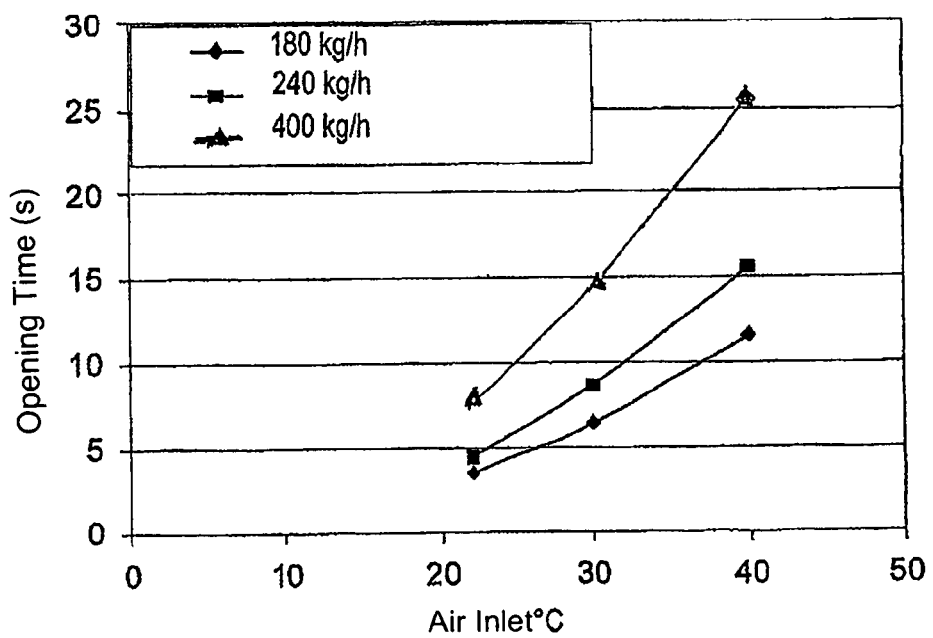
Figure 3:
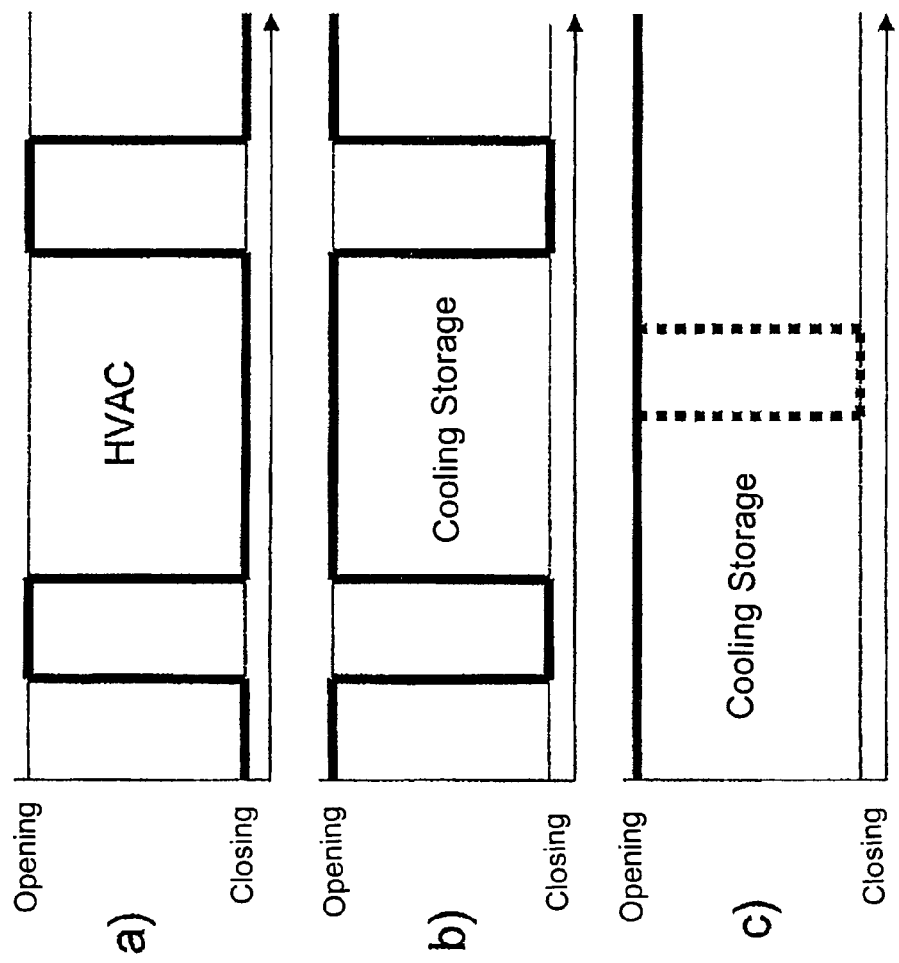

The method according to the invention will now be described in greater detail using the appended drawings. The drawings show in:

FIG. 1 the basic scheme of an air conditioning unit with a cold accumulator;

FIG. 2 a diagram that shows the opening time of the stop valve to the consumer branch having an air cooler/heater as a function of the air mass flows at the corresponding evaporator; and FIG. 3 a time diagram of the opening and closing states of the stop valve to the consumer branches.

The air conditioning unit with cold accumulator represented schematically in FIG. 1 is a component of an HVAC unit for commercial vehicles. In a cooling circuit are located a compressor 10, a condenser 12, a refrigerant accumulator 14, a stop valve 16, a thermostatic reducing nozzle 18, and an evaporator 20 from which the refrigerant returns again to the compressor 10 by way of a suction line 22. The air to be climatized of the operator's cab flows through the evaporator 20 and is thus a component of a primary consumer branch.

Parallel to the primary consumer branch is an auxiliary consumer branch, which is connected by another stop valve 24, which auxiliary consumer branch includes pressure-reducing nozzle 26 and evaporator 28. The evaporator 28 is a component of a cold accumulator 30 that forms a heater, the evaporator being thermally connected with a flow path 32 for a heat transfer medium in an auxiliary air conditioning circuit. This auxiliary air conditioning circuit contains a heater 34, a compensation reservoir 36, and a circulation pump 38 and is assigned to a rest cab of a commercial vehicle, for example.

The control of the stop valves 16 and 24 is effected according to the method of the invention. Its particular feature above all consists in the opening time for the stop valve 16 of the primary consumer branch being limited. The respective stop valve is thus open for only a limited period of time. This prevents the evaporator 20 from collecting too much liquid refrigerant and then, because of the low temperature at the evaporator 28 of the auxiliary consumer branch, which can reach −20° C., the evaporator 20 frosts if the stop valve 16 is already closed. The optimal duration of the opening time for the stop valve 16 depends on different factors. The most important factors are the air entry temperature and the air mass flows at the evaporator 20 of the refrigerant circuit. FIG. 2 shows, as an example that is nevertheless entirely characteristic, the optimal values for three different air mass flows in an ambient temperature range of 22° C. to 40° C. The predetermined opening times for the stop valve 16 lie within the range of 3 to 12 seconds for a flow of 180 kg/h, 4 to 16 seconds for a flow of 240 kg/h, and 8 to 26 seconds for a flow of 400 kg/h. The duration tends to increase both with increasing temperatures as well as with increasing flows.

In a particularly advantageous embodiment of the method, the opening time $D_{OP}$ is determined as follows:

$$D_{op} = 0.0072 * T_{amb}^{1.999} * \left(\frac{Q_{af}}{180}\right)^{0.9}$$

Therein, $T_{ein}$ is the air inlet temperature and $Q_{af}$ is the air mass flow.

Additional parameters for determining the optimal opening time are the speed or capacity of the compressor as well as different temperatures and/or pressures measured in the system.

As shown in FIG. 3, it is fundamental that stop valve 16 (FIG. 3a) is open when the stop valve 24 (FIG. 3b) is closed, and conversely.

The stop valve 24 can, however, also be controlled independently of the state of the stop valve 16. If there is sufficient cooling capacity, it can remain open permanently until the cold accumulator is 30% to 100% charged. This is made clear with the continuous line in FIG. 3c. Alternatively, the stop valve 24 can be temporarily closed, as is represented by the dotted line in FIG. 3c, if the cooling requirement in the primary consumer branch dramatically increases rapidly, for example.

According to the method of the invention, the switching statuses of the unit account for not only the charging state of the cold accumulator, but also the relevant temperatures to ensure a sufficient conditioning of the primary consumer, customarily in the operator's cab in the case of a commercial vehicle, and to avoid frosting of the evaporator of the refrigerant circuit. However, it is now possible to considerably decrease the temperature level at the air discharge of the evaporator compared to conventional solutions. In this manner, the stop valve 24 of the auxiliary consumer branch is closed if the cold accumulator is 30% to 100% charged. In operation with charging of the cold accumulator, the stop valve 16 of the primary consumer branch is opened if the air outlet temperature at the evaporator 14 of the primary consumer branch surpasses a maximal limit temperature in the range of approximately 3° C. to 10° C., preferably 5° C. In this instance, cooling is required in the primary consumer branch. The stop valve 24 of the auxiliary consumer branch is opened and the stop valve 16 of the primary consumer branch is closed if either the air outlet temperature at the evaporator 14 of the primary consumer branch falls below a minimal limit temperature in the range of approximately 0° C. to 6° C., preferably 1° C. to 5° C., and more preferably 3° C. or
the predetermined opening time for the stop valve 16 of the primary consumer branch is surpassed.

In both instances, the cooling capacity can be used entirely for charging the cold accumulator 30.

Prior to opening the stop valve 16 in connection with a permanently or alternatingly open state of the stop valve 24, the compressor 10 is preferably deactivated for a period of 5 to 30 seconds. During this period, the very low temperature of up to −20°, which is required for charging the cold accumulator, can increase to an uncritical value in order to ensure that the evaporator 20 will not ice.

In the use of a compressor with variable displacement, the control of the stop valves is also carried out according to the method described. It is namely not possible to prevent freezing of the evaporator 20 in the refrigerant circuit solely by controlling the volume of compressor capacity, and the control is unsuited on the basis of the air discharge temperature at the evaporator 20 because the temperature level of 0° C. to 4° C. is far too high for the cold accumulator to charge. The only additional measure in the use of a compressor with variable displacement is limiting the minimal evaporator pressure to approximately 2 bar in order to prevent a suction pressure that is too low in the case of maximum compressor speed and low air inlet temperatures.

The invention claimed is:

1. A method for operating an air conditioning unit for a car, which air conditioning unit has a refrigerant circuit with a primary consumer branch having a compressor, a condenser, and an evaporator, which air conditioning unit also has at least one auxiliary consumer branch that is connected parallel to the primary consumer branch and has a cold accumulator and its own evaporator, wherein a stop valve is arranged in front of each evaporator, said method characterized in that in the operational phase of charging the cold accumulator, the stop valve (16) of the primary consumer branch is regularly opened only for a predetermined opening time ($D_{op}$) only, wherein the predetermined opening time ($D_{op}$) is calculated based on the air inlet temperature and the air mass flow at the evaporator (20) of the primary consumer branch.

2. A method according to claim 1, characterized in that the predetermined opening time ($D_{op}$) is a function of the air inlet temperature $T_{ein}$ and the air mass flow $Q_{af}$ as follows:

$$D_{op} = 0.0072 * T_{amb}^{1.999} * \left(\frac{Q_{af}}{180}\right)^{0.9}$$

3. A method according to claim 1, characterized in that a) the stop valve (24) of the auxiliary consumer branch is closed and the stop valve (16) of the primary consumer branch is opened if the air outlet temperature at the evaporator (20) of the primary consumer branch surpasses an upper limit temperature in the range of 3° C. to 10° C.

4. A method according to claim 1, characterized in that b) the stop valve (24) of the auxiliary consumer branch is opened and the stop valve (16) of the primary consumer branch is closed if either b1) the air outlet temperature at the evaporator (20) of the primary consumer branch falls below a lower limit temperature in the range of approximately 0° C. to 6° C. or b2) the predetermined opening time for the stop valve (16) of the primary consumer branch is exceeded.

5. A method according to claim 1, characterized in that the stop valve (24) of the auxiliary consumer branch is permanently open as long as the cold accumulator is not completely charged and the condition remains met that the air outlet temperature at the evaporator of the primary consumer branch does not surpass the maximal limit value in the range of approximately 4° C. to 10° C.

6. A method according to claim 1, characterized in that the stop valve (24) of the auxiliary consumer branch remains open during a charging phase of the cold accumulator, while the stop valve (16) of the primary consumer branch is alternatingly opened and closed.

7. A method according to claim 1, characterized in that the compressor (10) is stopped 5 to 30 seconds prior to the opening of the stop valve (16) of the primary consumer branch.

8. A method according to claim 7, characterized in that the stop valve (24) of the auxiliary consumer branch is alternatingly opened and closed.

9. A method according to claim 1, characterized in that the stop valve (24) of the auxiliary consumer branch is controlled independently of the open and closed status of the stop valve (16) of the primary consumer branch.

10. A method according to claim 1, characterized in that the predetermined opening time is determined in consideration of the thermal load of the evaporator (20) in the primary consumer branch.

11. A method according to claim 10, characterized in that the predetermined opening time ranges from several seconds to several tens of seconds, tending toward longer times both with increasing air inlet temperatures as well as with increasing air mass flows.

12. A method according to claim 1, characterized in that the use of a compressor having a variable volume flow results in a limitation of the minimal evaporator pressure to around 2 bar in particular.

13. A method according to claim 6, characterized in that the compressor (10) is stopped 5 to 30 seconds prior to the opening of the stop valve (16) of the primary consumer branch.

14. A method according to claim 13, characterized in that the stop valve (24) of the auxiliary consumer branch is alternatingly opened and closed.

* * * * *

UNITED STATES PATENT AND TRADEMARK OFFICE
CERTIFICATE OF CORRECTION

PATENT NO. : 8,726,687 B2
APPLICATION NO. : 12/426452
DATED : May 20, 2014
INVENTOR(S) : Roland Haussmann Page 1 of 1

It is certified that error appears in the above-identified patent and that said Letters Patent is hereby corrected as shown below:

IN THE CLAIMS:

Column 5, line 45, please delete "only" before "wherein"

Signed and Sealed this
Seventh Day of April, 2015

Michelle K. Lee
*Director of the United States Patent and Trademark Office*

UNITED STATES PATENT AND TRADEMARK OFFICE
CERTIFICATE OF CORRECTION

PATENT NO. : 8,726,687 B2
APPLICATION NO. : 12/426452
DATED : May 20, 2014
INVENTOR(S) : Haussmann Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1037 days.

Signed and Sealed this
Eighth Day of September, 2015

Michelle K. Lee
*Director of the United States Patent and Trademark Office*